US006816311B1

United States Patent
Lissotschenko et al.

(10) Patent No.: US 6,816,311 B1
(45) Date of Patent: Nov. 9, 2004

(54) PRODUCTION OF LINES OF LIGHT AS AN AID TO POSITIONING A ROBOT

(75) Inventors: Vitalij Lissotschenko, Dortmund (DE); Alexei Mikhailov, Dortmund (DE)

(73) Assignee: Hentze-Lissotschenko Patentverwaltungs GmbH & Co. KG, Norderfriedrichskoog (DE)

( * ) Notice: Subject to any disclaimer, the term of this patent is extended or adjusted under 35 U.S.C. 154(b) by 156 days.

(21) Appl. No.: 10/030,084

(22) PCT Filed: Jun. 27, 2000

(86) PCT No.: PCT/EP00/05934
§ 371 (c)(1),
(2), (4) Date: May 24, 2002

(87) PCT Pub. No.: WO01/03892
PCT Pub. Date: Jan. 18, 2001

(30) Foreign Application Priority Data

Jul. 13, 1999 (DE) ............................. 199 32 590

(51) Int. Cl.[7] ................... G02B 27/10; G02B 13/08; G02B 13/18; G02B 3/06
(52) U.S. Cl. ................... 359/618; 359/668; 359/710
(58) Field of Search ................ 359/577, 668, 359/710, 640, 618, 740, 900; 250/203.1, 539.33; 396/307, 308; 356/400; 700/258, 259; 101/47

(56) References Cited

U.S. PATENT DOCUMENTS

| 1,921,918 | A |   | 8/1933  | Goodwin                  |
|-----------|---|---|---------|--------------------------|
| 4,453,085 | A |   | 6/1984  | Pryor                    |
| 4,523,809 | A |   | 6/1985  | Taboada et al.           |
| 4,602,163 | A | * | 7/1986  | Pryor ............ 250/559.33 |
| 5,095,386 | A | * | 3/1992  | Scheibengraber ...... 359/668 |
| 5,854,880 | A |   | 12/1998 | Pryor                    |

FOREIGN PATENT DOCUMENTS

DE          428603        5/1926

* cited by examiner

Primary Examiner—Hung Xuan Dang
Assistant Examiner—Joseph Martinez
(74) Attorney, Agent, or Firm—Hoffman, Wasson & Gitler, P.C.

(57) ABSTRACT

This invention relates to a device for producing lines of groups of lines of electromagnetic radiation of the optical spectral range in a definable area of space. The lines or groups of lines can be used as positioning aids or geometry detection aids, and they include at least one conversion unit which is at least partially transparent to the electromagnetic radiation used, and which can convert the electromagnetic radiation passing through it, especially coherent radiation or laser radiation, such that the electromagnetic radiation forms at least one line of group of lines in a given three-dimensional area.

10 Claims, 1 Drawing Sheet

PRODUCTION OF LINES OF LIGHT AS AN AID TO POSITIONING A ROBOT

BACKGROUND OF THE INVENTION

This invention relates to a device for producing lines or groups of lines of electromagnetic radiation of the optical spectral range in a definable area of space. The lines or groups of lines can be used as positioning aids or geometry detection aids, and they include at least one conversion unit which is at least partially transparent to the electromagnetic radiation used, and which can convert the electromagnetic radiation passing through it, especially coherent radiation or laser radiation, such that the electromagnetic radiation forms at least one line or group of lines in a given three-dimensional area.

A device of this type is used, for example, to give to a robot a positioning aid for machining of a workpiece, or to make available to the robot a recognition aid for the contour or the geometry of a workpiece. Generally, the electromagnetic radiation is laser light which passes through the conversion unit into the stipulated three-dimensional area located, for example, on the workpiece such that on the workpiece for the robot, recognizable groups of lines are copied in the form of a planar orthogonal grid. Using these groups of lines, made for example as grids, the robot is enabled to machine the workpiece at given points.

Conversion units in the past are diffractive elements such as holograms which can diffract parts of the laser light penetrating the conversion unit, such that in the given three-dimensional area, for example, on the workpiece, lines, or for example, grid-shaped groups of lines form. One defect, in the past embodiments of the conversion unit using diffractive elements, is that a substantial portion of the electromagnetic radiation is diffracted into undesirable orders so that generally far less than 50% of the electromagnetic radiation incident on the conversion unit contributes to producing lines or groups of lines. Furthermore, when the conversion unit is equipped with diffractive elements, it is disadvantageous that only very small widening angles can be achieved, so that only in a relatively small range of solid angles behind the conversion unit, can lines or groups of lines be produced.

The object of this invention is to devise a device of the initially mentioned type which is made to be more efficient.

SUMMARY OF THE INVENTION

This is achieved as depicted in the invention, in that the conversion unit includes at least one refractive element. By refraction of the radiation passing through the conversion unit, on at least one optically functional interface of the refractive element, at least one line or group of lines is formed in the given three-dimensional area. When using a refractive element, much higher efficiencies of almost 100% can be achieved. Furthermore, refractive elements make it possible to dramatically broaden the electromagnetic radiation incident on the conversion unit, so that the desired lines, or groups of lines, can be formed in an essentially larger range of solid angles behind the conversion unit.

To do this, the optically functional interface of at least one refractive element can have a freely selectable configuration which is suitable for the lines, or line groups, to be produced. It is, for example, possible to divide the optically functional interface of at least one refractive element into segments. In this case, the segments can have the same size and can be shaped to be identical.

According to one preferred embodiment of this invention, the individual segments can have a cylinder lens geometry, there being, preferably, two groups of segments with cylinder axes of cylindrical geometry perpendicular to one another. The cylinder lens geometry of the individual segments can be a spherical, or an aspherical, cylinder lens geometry. Especially in the choice of these cylinder lens geometries, is it possible to widen the electromagnetic radiation passing through the conversion unit behind the latter into a solid angle of up to, or even more than, 180°. For example, groups of crossed lines can be formed, by the arrangement of individual segments of the optically functional interface, as cylinder lens segments with cylinder axes perpendicular to one another and can form a grid-like structure, as for example, a planar orthogonal grid with a correspondingly array-like arrangement of the refractive elements.

It is possible, as depicted in the invention, for the produced lines to be straight or even curved lines. Furthermore, it is possible for the generated groups of lines to be crosses, triangles, polygons or grids, and the lines which form the individual groups of lines can be at a right, or at a non-right angle to one another.

According to one preferred embodiment of this invention, the generated lines or groups of lines are curved such that upon incidence on a curved surface of a workpiece in a given three-dimensional area on this workpiece, they form a planar structure, especially a planar, orthogonal grating. It is, for example, conceivable that in machining robot machines, the workpiece removes material from the workpiece with the aid of the aforementioned inherently curved grid structure until the sensors of the robot detect that the line structure which is incident on the machined curved surface of the workpiece forms a planar orthogonal grid. The conversion unit, encompassed by the device as depicted in the invention, causes distortion of the traversing electromagnetic radiation which is distorted by a correspondingly curved workpiece such that a clearly detectable structure like a planar orthogonal grid is formed.

It is possible for the device to include a source for producing electromagnetic radiation, especially a laser light source. The device together with the laser light source can be used either as a separate unit or can, for example, be installed in a corresponding robot for machining of workpieces.

It is also possible to use one such device for process monitoring, for example, to monitor a welding process, here especially, an application in conjunction with CMOS cameras is suitable, because these CMOS cameras have much higher dynamics so that among others both the welding point and also its vicinity can be better recognized, so that, for example, the lines, or groups of lines, imaged on the workpiece to be welded can be better recognized by the welding unit, or the process monitoring unit. Other possible applications of a device as depicted in the invention are in the area of surface analysis or three-dimensional assignment, especially tracking of a system.

BRIEF DESCRIPTION OF THE FIGURES

Other advantages and features of this invention become clear from the following description of preferred embodiments with reference to the attached Figures.

DETAILED DESCRIPTION OF THE INVENTION

Figure 1:
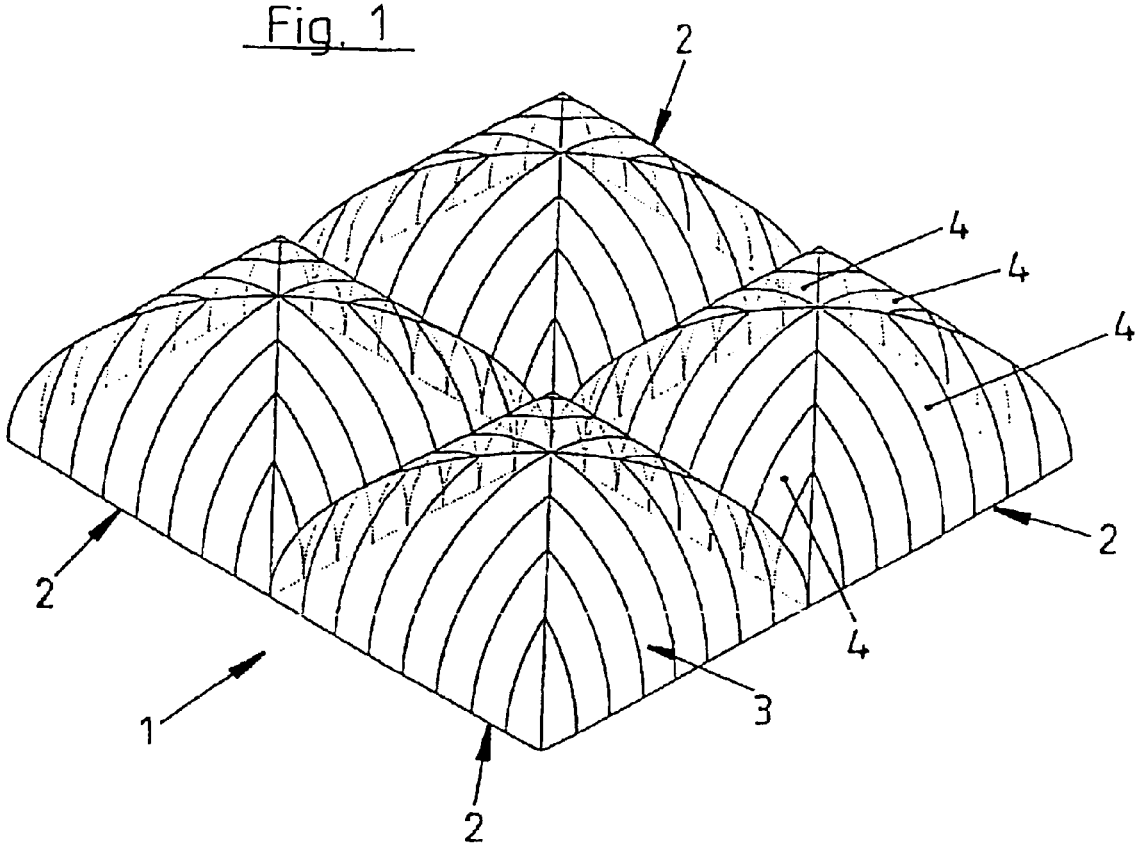
FIG. 1 shows a perspective view of a conversion unit as claimed in the invention.

First, reference is made to FIG. 1. The sample embodiment of a conversion unit 1 as depicted in the invention, as shown in FIG. 1, is composed of four identical refractive elements 2. In the embodiment shown, the refractive elements 2 are each of the same size and each have a-planar quadratic entry surface for the electromagnetic radiation, the four entry surfaces being located bordering one another such that the four quadratic planar entry surfaces of the refractive elements form a continuous square.

One optically functional interface 3, which is used as the exit surface for the electromagnetic radiation, made for example as a laser beam is opposite the planar entry surface of each of the refractive elements 2. In the embodiment shown, the optically functional interfaces 3 are each divided into four segments 4. In the embodiment shown, the segments being chosen such that the refractive element 2 represents a regular four-sided pyramid with curved side surfaces. The curvature of the segments 4 of the optically functional interface 3 is chosen in the embodiment shown such that the segments 4 opposite one another are sections of the same cylinder jacket. Here the cylinder axes of adjacent segments 4 are perpendicular to one another at the same time. Each of the refractive elements 2 thus include, in the embodiment shown, an optically functional interface 3 which is composed of four segments 4 which are used as cylinder lenses. These segments 4 which are used as cylinder lenses touch one another at the tip of the aforementioned regular polygonal pyramid with curved side surfaces.

Figure 2:
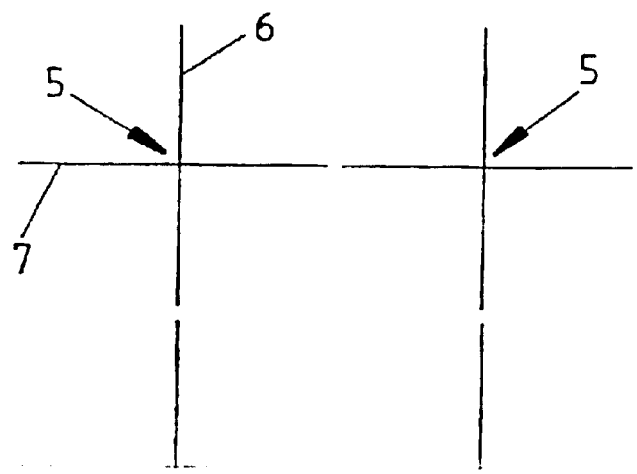
FIG. 2 shows a plan view of four groups of lines of electromagnetic radiation which can be produced using the conversion unit as shown in FIG. 1 in a predefinable three-dimensional area.

With corresponding transparency of the conversion unit, shown in FIG. 1, to the electromagnetic radiation incident on the conversion unit 1, in the three-dimensional area which is located preferably at the distance of the focal length of the cylinder lens-like segment 4 from the conversion unit, there is an arrangement of groups 5 of lines which is apparent from FIG. 2. Each of the groups 5 of lines include two lines 6, 7 which cross one another at an angle of 90°. Each of the lines 6 and 7 represents a combined focal line of two segments 4 of an optically functional interface 3 of one of the refractive elements 2, the two segments 4 being opposite one another. The vertical position of the cylinder axes of adjacent segments 4 of refractive elements 2 yields the cross shape of each of the groups 5 of lines. In particular, the right angle between the lines 6 and 7 follows from the cylinder axes of adjacent segments 4 being perpendicular to one another.

If the cylinder axes of adjacent segments are not perpendicular to one another, there is a group of lines in which the individual lines cross at an angle which is not equal to a right angle. It is possible as depicted in the invention to choose different geometries of the individual segments. For example, aspherical cylinder geometries can be used, or even largely free-form surface geometries. It is also possible to divide the optically functional interfaces into more or less than four segments.

In this way, not only crossed groups of lines which according to FIG. 2 overall yield a grid, but also lines which yield a triangle or lines which yield a polygon and which are then combined with the corresponding other groups of lines into patterns can be produced. It is also possible to execute the individual lines as curved lines, depending on the geometrical configuration of the individual segments or the individual optically functional interfaces of the conversion unit.

Furthermore, it is possible to produce for example grid-shaped groups of lines which then become apparent only as an orthogonal grid structure when the laser radiation passing through the conversion unit in the given three-dimensional area is incident on a curved surface of a workpiece. One such structure which appears as an orthogonal grid structure in projection onto a curved surface could be used, for example, within the framework of machining processes on the aforementioned workpiece. In particular, a robot which shapes a workpiece could remove material in a controlled manner on the workpiece until the light passing through from the conversion unit to the workpiece yields an orthogonal planar grid. In this case, the workpiece has the desired curved surface on which the projected groups of lines yield an orthogonal planar grid.

It is furthermore possible for the device for producing lines or groups of lines to be integrated into a robot which machine workpiece so that both a laser light source and also a corresponding conversion unit are encompassed by the robot. Alternatively, there can be a separate device for producing lines of group of lines which includes a laser light source and a conversion unit and accordingly must be arranged at a given interval to the workpiece which is to be machined by the robot.

What is claimed is:

1. A device for producing at least one line, or a group of lines of electromagnetic radiation of the optical spectral range in a preselectable three-dimensional area, the at least one line, or the group of lines, are used as positioning aids, or geometry detection aids, the device comprising at least one conversion unit which is at least partially transparent to the electromagnetic radiation used and which can convert the eletromagnetic radiation passing through it, such that the electromagnetic radiation forms the at least one line, or the group of lines in a given three-dimensional wherein the conversion unit comprises at least one refractive element, by refraction of the radiation passing through the at least one conversion unit on at least one optically functional interface of the refractive element the at least one line or the group of lines being formed in a given three-dimensional area, wherein the at least one optically functional interface of the at least one refractive element is divided into segments.

2. The device as claimed in claim 1, wherein the at least one optically functional interface of the at least one refractive element has a freely selectable configuration which is suitable for the at least one line or the group of lines to be produced.

3. The device as claimed in claim 1, wherein the segments have the same size and have an identical shape.

4. Device as claimed in claim 1, wherein the segments have a cylinder lens geometry, and wherein two groups of the segments, with groups being perpendicular to one another.

5. The device as claimed in claim 4, wherein the cylinder lens geometry of the segments is a spherical or an aspherical cylinder lens geometry.

6. The device as claimed in claim 1, wherein the at least one line is a straight line or a curved line.

7. The device as claimed in claim 1, wherein the group of lines can be crosses, triangles, polygons or lattices, and the at least one line, which form the group of lines can be on top of one another at a right angle or at an angle which differs from a right angle.

8. The device as claimed in claim 1, wherein the at least one line or the group of lines are curved such that they image a planer orthogonal lattice, when they encounter a curved surface of a workpiece in a given three-dimension area on the latter.

9. The device as claimed in claim 1, wherein the device further comprises a laser light source for producing the electromagnetic radiation.

10. Robots for machining of workpieces comprising a device as claimed in claim 1.

* * * * *